United States Patent
Kennedy

(10) Patent No.: US 6,746,189 B2
(45) Date of Patent: Jun. 8, 2004

(54) APPARATUS FOR TRANSPORTING AUTOMOBILE SEATS FOR ASSEMBLY

(75) Inventor: Phil Kennedy, Boaz, AL (US)

(73) Assignee: TS Tech Alabama, LLC, Boaz, AL (US)

( * ) Notice: Subject to any disclaimer, the term of this patent is extended or adjusted under 35 U.S.C. 154(b) by 0 days.

(21) Appl. No.: 10/282,750

(22) Filed: Oct. 29, 2002

(65) Prior Publication Data
US 2004/0081527 A1 Apr. 29, 2004

(51) Int. Cl.7 .................................................. B60P 7/08
(52) U.S. Cl. ............................. 410/43; 410/35; 410/46
(58) Field of Search .............................. 410/43, 31, 32, 410/35, 46, 89; 108/55.1, 55.3

(56) References Cited

U.S. PATENT DOCUMENTS

| | | | |
|---|---|---|---|
| 1,659,660 A | * 2/1928 | Meredith et al. | 410/43 |
| 1,750,128 A | * 3/1930 | Romine | 410/2 |
| 2,123,362 A | * 7/1938 | Isaacson | 410/43 |
| 2,428,893 A | * 10/1947 | Procissi | 410/31 |
| 2,521,088 A | * 9/1950 | Phelps | |
| 2,555,529 A | * 6/1951 | Batts | 410/35 |
| 3,580,606 A | * 5/1971 | Wagner | 410/43 |
| 3,709,155 A | * 1/1973 | Pringle | 410/7 |
| 4,545,710 A | * 10/1985 | Hepp | 410/32 |
| 5,101,964 A | * 4/1992 | Westphal | |
| 5,466,103 A | * 11/1995 | Herrmeyer | 410/33 |
| 5,497,708 A | * 3/1996 | Jeruzal | |
| 5,526,940 A | * 6/1996 | Shea et al. | |
| 5,797,712 A | * 8/1998 | Gearin et al. | 410/16 |
| 5,853,280 A | * 12/1998 | Lohr | |
| 6,183,176 B1 | * 2/2001 | Weiner | 410/32 |

OTHER PUBLICATIONS

G. Cannavo et al., Foam Moulded Polycarbonate Multifunctional Pallets for Shipping, Handling and Assembly Seats, 1989 Conference Abstract.

* cited by examiner

Primary Examiner—Stephen Gordon
(74) Attorney, Agent, or Firm—David E. Nixon; Bradley Arant Rose & White LLP

(57) ABSTRACT

An apparatus for transporting automobile seats to an automobile assembly plant is disclosed. The apparatus includes a container and a storage bracket located within the container. The storage bracket stores the seats by sets. A single set contains all of the seats necessary for installation in a single automobile. This allows all of necessary seats for one automobile to be unloaded from a single container.

9 Claims, 4 Drawing Sheets

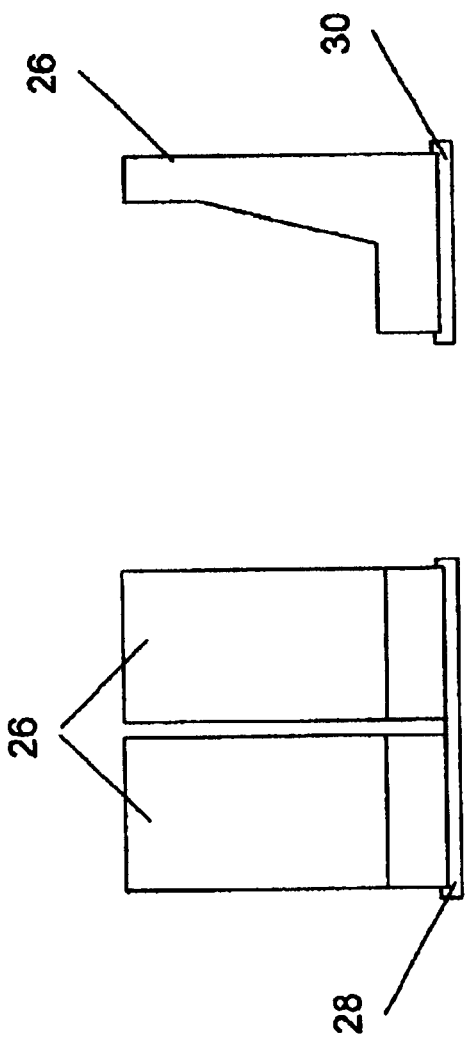
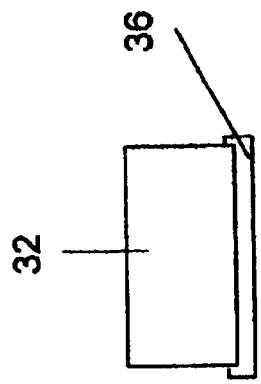
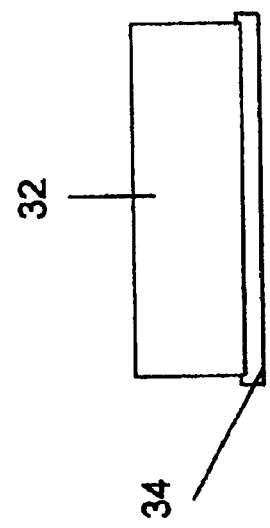

APPARATUS FOR TRANSPORTING AUTOMOBILE SEATS FOR ASSEMBLY

BACKGROUND OF INVENTION

1. Field of the Invention

The invention relates generally to transportation equipment. More specifically, the invention relates to an apparatus for transporting automobile seats to an assembly plant.

2. Background Art

The manufacture of automobiles involves the receipt and assembly of a great many components. The manufacturer places a premium on efficiency and organization of an assembly line. Such efficiency is critical to avoiding costly delays and increasing productivity. Typically, a manufacturer will receive numerous components for the finished product from many different suppliers. It is incumbent upon those suppliers to make the transfer and unloading of the components as easy and as efficient as possible for the manufacturer.

One example of a component that is necessary for a manufacturer is the seats for an automobile. In modern automobiles such as mini-vans and sport utility vehicles (SUVs), as many as five different types of seats are used in the same vehicle. For example, a typical mini-van has three rows of seating. The first row includes an individual seat for the driver on the left and a front passenger on the right. The second row also includes individual seats for two passengers with one each on the left and right. The third row is typically a single bench seat that holds multiple passengers. Each of these seats is different from the others due to customized features such as folding armrests, power adjustments, heaters, etc. Prior art shipping procedures for seats involved the use of separate trucks that each carried one type of seat. Typically, seats for assembly are delivered in trailers hauled by tractor-trailer trucks. The standard dimensions for a tractor trailer includes a 113 inch high opening at the rear of the trailer and an interior length of 53 feet. The trailer has two sets of 47 inch tires that are mounted on two separate axles. The trailer carried seats in a two-tiered arrangement with thirty pallets of seats on the floor of the trailer and thirty pallets of seats carried above the lower pallets of seats.

Consequently, an assembly plant for a manufacturer may be faced with organizing five separate receiving lines for seats from five separate receiving docks. This procedure involves a significant amount of time and effort to co-ordinate the receipt and organization of the seats into sets for assembly into a single automobile.

SUMMARY OF INVENTION

In some aspects, the invention relates to an apparatus for transporting automobile seats, comprising: a container suitable for transporting a plurality of automobile seats; and a storage bracket located within the container, where the storage bracket holds a plurality of sets of automobile seats that are segregated by set.

In other aspects, the invention relates to an apparatus for transporting automobile seats, comprising: means for storing the plurality of automobile seats; and means for transporting the plurality of automobile seats.

The advantages of the invention include an efficient way to transport automobile seats for assembly where the seats are loaded and unloaded by sets. A set is all of the different types of seats that a necessary for assembly in a single automobile. Other aspects and advantages of the invention will be apparent from the following description and the appended claims.

BRIEF DESCRIPTION OF DRAWINGS

It should be noted that identical features in different drawings are shown with the same reference numeral.

FIG. 2A shows a frontal view of a storage bracket pallet for front and middle seats in accordance with one embodiment of the invention.

FIG. 2B shows a side view of a storage bracket pallet for front and middle seats in accordance with one embodiment of the invention.

FIG. 3A shows a frontal view of a storage bracket pallet for a rear seat in accordance with one embodiment of the invention.

FIG. 3B shows a side view of a storage bracket pallet for a rear seat in accordance with one embodiment of the invention.

DETAILED DESCRIPTION

Figure 1:
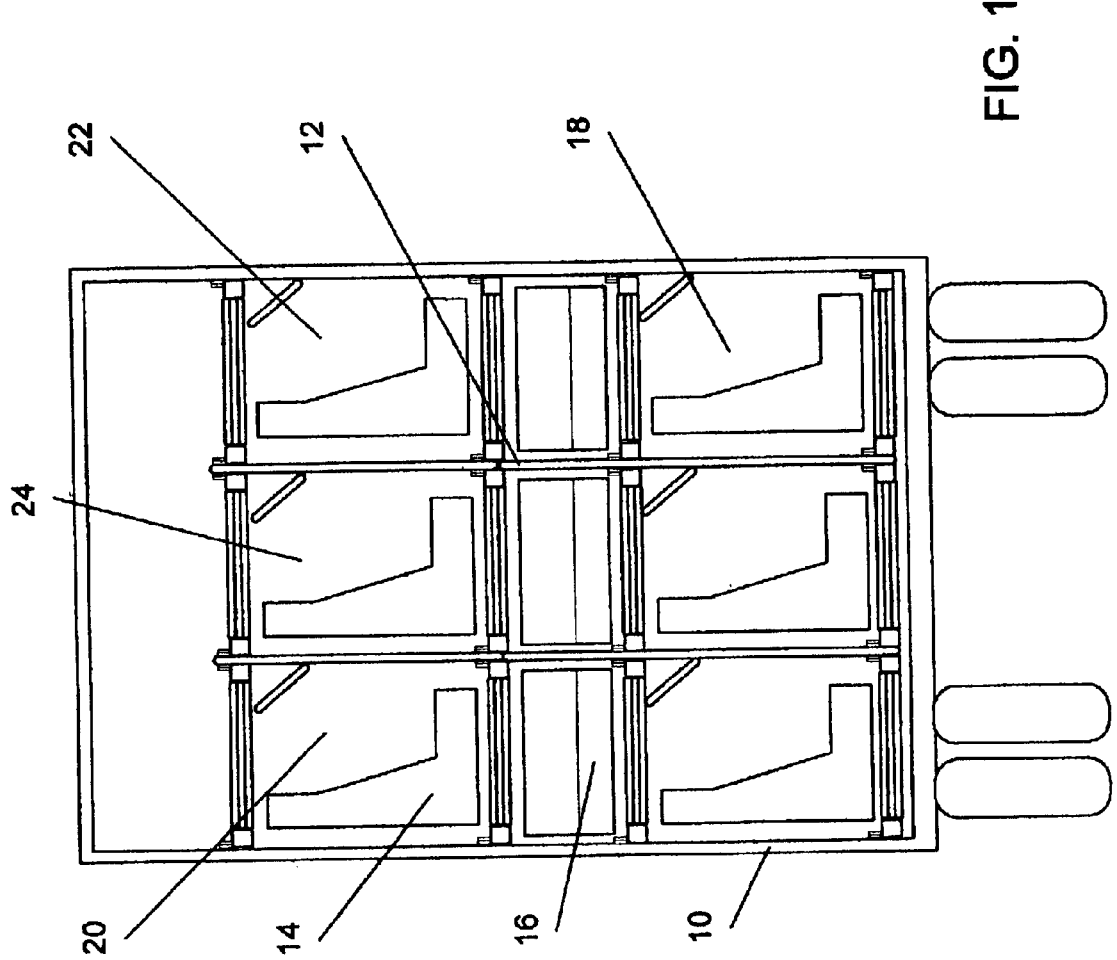
FIG. 1 shows a rear view of a trailer for transporting seats in accordance with one embodiment of the invention.

An apparatus for transporting automobile seats includes transporting seats by the set to an assembly plant. FIG. 1 shows a rear view of a trailer 10 for transporting seats in accordance with one embodiment of the present invention. The trailer 10 includes an internal storage bracket 12 for holding different types of the seats that are being shipped. The internal bracket 12 includes three distinct levels: an upper level 14; a middle level 16; and a lower level 18. Each level is further divided into three frames that hold pallets of seats: two exterior frames 20 and 22 and an interior frame 24.

Each level holds different type seats for transport. The pallets of the lower level 18 and the upper level 14 hold individual seats 26 that are transported in an upright position. These seats are typically suited to hold only one individual and they may be referred to as "bucket seats". FIGS. 2A and 2B show frontal and side views 28 and 30 of pallets of the, upper and lower levels of the trailer, respectively. As can be seen from the frontal view 28, the pallet is capable of holding two individual seats 26 in a side by side arrangement.

In comparison, the middle level 16 of bracket contains pallets that each hold a single multi-passenger seat 32. This seat 32 typically holds up to three passengers and may be called a "bench" seat. Because of its unique dimensions, the multi-passenger seat 32 is capable of being folded completely flat for shipment. FIGS. 3A and 3B show frontal and side views 34 and 36 of pallets of the middle level of the trailer, respectively. As can be seen from the frontal view 34, the pallet has room to hold one multi-passenger seat 32 during transport.

Figure 4:
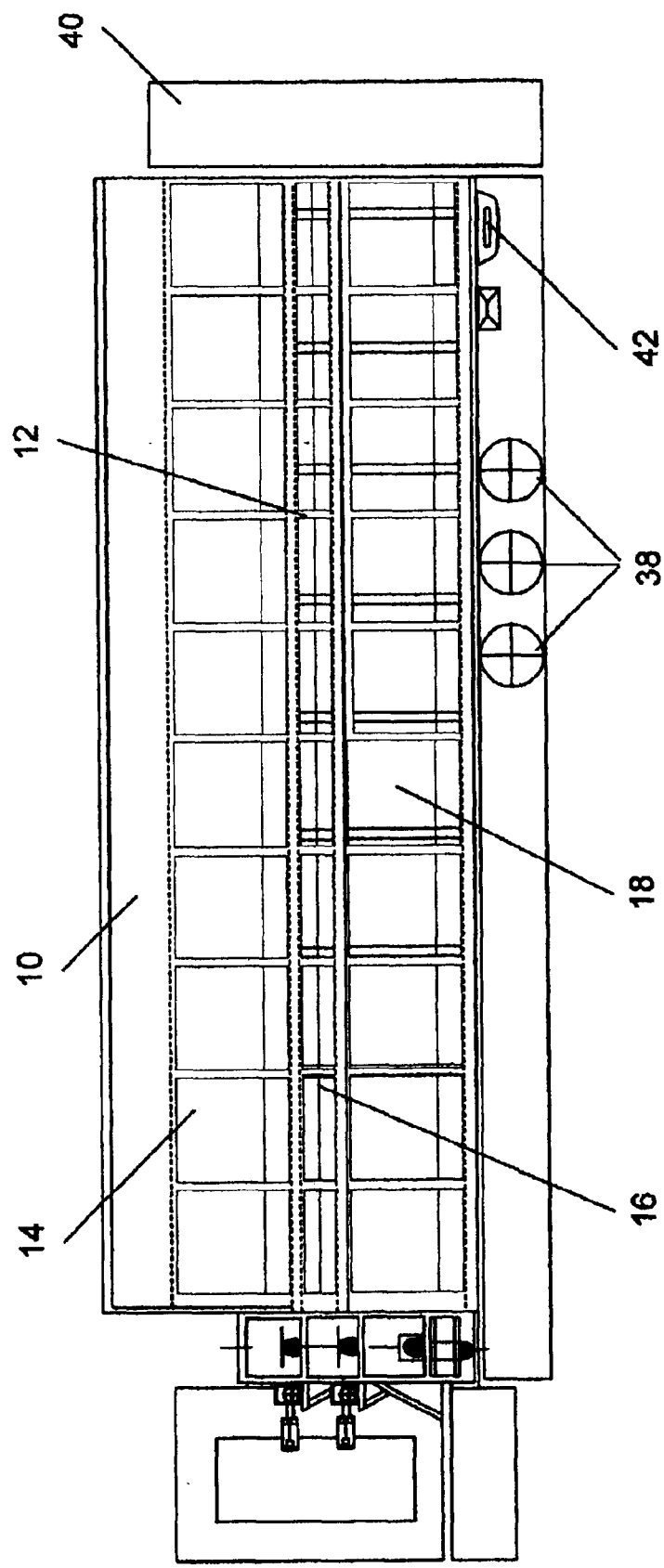
FIG. 4 shows a cut-away side view of a trailer for transporting seats in accordance with one embodiment of the invention.
Figure 5:
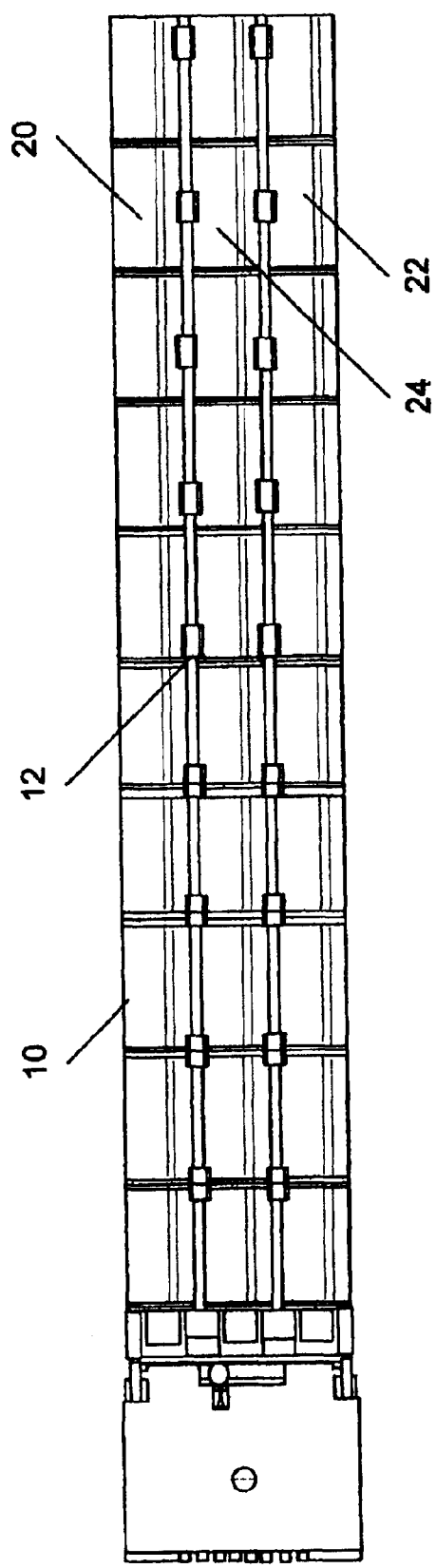
FIG. 5 shows an overhead view of a trailer for transporting seats in accordance with one embodiment of the invention.

In the present embodiment of the invention, the trailer 10 is a trailer for a tractor truck that has been modified to hold the internal storage bracket 12. FIG. 4 shows a cut-away side view of a trailer 10 for transporting seats in accordance with one embodiment of the invention. FIG. 5 shows an overhead view of a trailer 10 for transporting seats in accordance with one embodiment of the invention. As shown in both FIGS. 4 and 5, the trailer 10 holds ten rows of pallets. With three levels in the bracket 12, this results in a total ninety total pallets for the trailer 10: thirty on the upper level 14; thirty on the middle level 16; and thirty on the lower level 18. Since the pallets of upper and lower levels each hold two seats, the total number of one hundred fifty seats can be carried by the trailer.

The trailer 10 may be a modified tractor trailer that has been made taller and wider in order to accommodate the storage bracket 12. The trailer has a 128 inch high opening with an interior length of 46.5 feet to accommodate the ten rows of pallets. The exterior of the trailer is a standard height of 13.5 feet. The exterior length of the trailer is 56.5 feet with a 6 foot drop deck. Extra height is added to the interior dimensions of the trailer while still maintaining the overall standard exterior height by lowering the bottom of the exterior of the trailer. The trailer is equipped with three sets of rear wheels 38. This special three axle configuration of 17 inch wheels is mounted on special hubs. These wheels eliminate any "hump" along the floor of the interior of the trailer. Instead the interior floor is smooth and unobstructed along the entire length of the interior.

Additionally, the height of the trailer may be adjusted with an pressurized air suspension system. After the trailer 10 pulls up to the loading dock 40, the air is typically released to the lower the trailer 10 to within 1 inch laterally and 0.5 inches vertically of the shipping conveyor (not shown) on the dock 40. The seats are loaded onto the trailer automatically by a computer that controls the conveyor. The conveyor and the trailer communicate via a cable that is connected from a port 42 on the trailer to a port (not shown) at the dock 40. A fill shipment of seats for the trailer can be loaded or unloaded in six minutes.

The seats are loaded into the trailer in "sets". A set is an entire group of seats need for one vehicle. As previously discussed, typical configurations of mini-vans, SUVs, etc. have five different seats in one set. However, alternative embodiments could include sets of two, three, four or more seats of different types, depending on the needs of the vehicle. In the embodiment shown in FIG. 1, the upper level 14 of the storage bracket 12 contains the left front and left middle seats. The middle level 16 of the storage bracket 12 contains the rear seat. The lower level 18 of the storage bracket 12 contains the right front and right middle seats. Consequently, an entire five seat set of automobile seats is located on three tiers that are on top of each other. The trailer 10 contains three sets that are located across the width of the trailer. As shown in FIGS. 4 and 5, ten separate rows of three sets each are carried by the trailer for a total of thirty sets for a full load.

In alternative embodiments, the internal arrangement of the bracket may vary. For example, the rear seat may be carried in the upper or lower level while the middle level may carry an individual upright seat. In other embodiments, the vehicle that may be an entirely different type of vehicle such as a rail road car. Additionally, the dimensions of the trailer may be lengthened or shortened to carry different numbers of sets of seats. In other embodiments, different types of sets may be carried on the same bracket according to the orders of the customer. For example, different sets may feature seats of different colors or options (e.g., leather, cloth, etc.). Additionally, sets with different numbers of seats may be carried in the same bracket if the customer so desires. All of the possible arrangements and variations of the seats are controlled by a computer and are loaded in a "first on—last off" order.

The advantages of the present invention include an efficient way to transport automobile seats for assembly where the seats are loaded and unloaded by sets. This greatly increases the efficiency of the assembly plant because all of the seats needed for one automobile are removed from a single vehicle.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. An apparatus for transporting automobile seats, comprising:
   a container suitable for transporting a plurality of automobile seats; and
   a storage bracket located within the container, where the storage bracket holds a plurality of sets of automobile seats that are segregated by set.

2. The apparatus of claim 1, where the container is a trailer.

3. The apparatus of claim 2, where the trailer is a tractor trailer that is modified to carry the storage bracket.

4. The apparatus of claim 1, where the storage bracket comprises three separate levels for storing a set of automobile seats.

5. The apparatus of claim 4, where each set of automobile seats is segregated vertically across the three separate levels.

6. The apparatus of claim 1, where each set of automobile seats comprises five automobile seats.

7. The apparatus of claim 1, where the container carries ten rows of sets of automobile seats.

8. The apparatus of claim 7, where each row comprises three sets of automobile seats.

9. An apparatus for transporting automobile seats, comprising:
   means for storing automobile seats by set; and
   means for transporting automobile seats by set.

* * * * *